United States Patent
Bernal et al.

(10) Patent No.: US 11,434,985 B2
(45) Date of Patent: Sep. 6, 2022

(54) THREE-PASS TORQUE CONVERTER INCLUDING CLUTCH INTEGRATED WITH TURBINE

(71) Applicant: Schaeffler Technologies AG & Co. KG, Herzogenaurach (DE)

(72) Inventors: Luis Alberto Bernal, Puebla (MX); Angel Salvador Flores, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 115 days.

(21) Appl. No.: 17/108,021

(22) Filed: Dec. 1, 2020

(65) Prior Publication Data
US 2022/0170538 A1    Jun. 2, 2022

(51) Int. Cl.
*F16H 45/02* (2006.01)
*F16H 41/24* (2006.01)

(52) U.S. Cl.
CPC ............. *F16H 45/02* (2013.01); *F16H 41/24* (2013.01); *F16H 2045/021* (2013.01); *F16H 2045/0221* (2013.01)

(58) Field of Classification Search
CPC .............. F16H 45/02–2045/0294; F16H 41/24
See application file for complete search history.

(56) References Cited

U.S. PATENT DOCUMENTS

| | | | |
|---|---|---|---|
| 9,816,596 B1 | 11/2017 | Nelson et al. | |
| 9,964,193 B2 | 5/2018 | Lindemann et al. | |
| 9,995,381 B2 | 6/2018 | Adari | |
| 10,145,458 B2 | 12/2018 | Norwich et al. | |
| 10,753,446 B2 | 8/2020 | Norwich et al. | |
| 2013/0056319 A1* | 3/2013 | Lindemann | F16H 45/02 60/330 |
| 2014/0097055 A1* | 4/2014 | Lindemann | F16H 41/24 192/3.21 |
| 2014/0262666 A1* | 9/2014 | Ushio | F16D 47/06 192/3.29 |

FOREIGN PATENT DOCUMENTS

DE    102008048031 A1 *   3/2010   ............. F16H 45/02

* cited by examiner

*Primary Examiner* — Ernesto A Suarez
*Assistant Examiner* — Lillian T Nguyen

(57) ABSTRACT

A torque converter comprises a front cover, an impeller including an impeller shell fixed to the front cover, and a turbine including a turbine shell axially movable to frictionally engage the impeller shell such that the turbine shell forms a turbine piston of a lock-up clutch. A damper assembly disposed between the front cover and the turbine shell comprises: springs; a flange connected to the turbine shell and drivingly engaged with the springs; and a spring retainer supporting the springs and connected to a turbine hub. A piston plate may be disposed between the spring retainer and front cover and configured to be axially displaceable to force the turbine piston against the impeller shell for engagement of the lock-up clutch. A seal plate may be fixed to the front cover and disposed between the front cover and the piston plate with the piston plate sealed to the seal plate.

15 Claims, 2 Drawing Sheets

THREE-PASS TORQUE CONVERTER INCLUDING CLUTCH INTEGRATED WITH TURBINE

TECHNICAL FIELD

The present disclosure relates generally to torque converters and more specifically to torque converters having a clutch integrated with the turbine.

BACKGROUND

Many vehicles include a launch device between the engine and the transmission. A torque converter is a type of launch device commonly used in vehicles having an automatic transmission. A typical torque converter includes an impeller shell fixed to the crankshaft of the engine and a turbine fixed to a turbine shaft, which is the input to the transmission. To improve fuel economy, most torque converters include a bypass or lock-up clutch that mechanically couples the turbine shaft to a housing of the torque converter to bypass the fluid coupling. In some torque converters, the lock-up clutch may be integrated with the turbine (also referred to as a turbine piston).

SUMMARY

In general, embodiments of the present disclosure provide a torque converter comprising a front cover, an impeller including an impeller shell fixed to the front cover, and a turbine including a turbine shell axially movable to frictionally engage the impeller shell such that the turbine shell forms a turbine piston of a lock-up clutch. A damper assembly may be disposed between the front cover and the turbine shell. The damper assembly may comprise springs; a flange connected to the turbine shell and drivingly engaged with the springs; and a spring retainer supporting the springs and connected to a turbine hub. A piston plate may be disposed between the spring retainer and the front cover, wherein the piston plate is configured to be axially displaceable to force the turbine piston against the impeller shell for engagement of the lock-up clutch. A seal plate may be fixed to the front cover and disposed between the front cover and the piston plate, wherein the piston plate is sealed to the seal plate.

In embodiments, the piston plate is sealed to the seal plate at an outer diameter and connected to the spring retainer and the turbine hub by a connector. A first chamber is formed, at least in part, by the front cover, the seal plate, and the piston plate. A first flow path is configured to supply fluid to the first chamber and is bound, at least in part, by the turbine hub and the front cover. A second chamber is formed, at least in part, by the front cover, the piston plate, and the turbine shell. A second flow path is configured to supply fluid to the second chamber and is bound, at least in part, by the turbine hub and a stator hub. The spring retainer may include an opening extending axially therethrough and the fluid is supplied from the second flow path to the second chamber via the opening. A third chamber is formed, at least in part, by the turbine shell and the impeller shell. A third flow path is configured to supply fluid to the third chamber and is bound, at least in part, by the stator hub and an impeller hub.

In embodiments, during a lock-up mode of operation: the first chamber is supplied fluid from the first flow path such that the piston plate is displaced axially toward the turbine shell forcing the turbine piston against the impeller shell; and the second chamber is supplied cooling fluid from the second flow path that is then forced through the lock-up clutch into the third chamber exiting through the third flow path. During clutch release, the third chamber is supplied fluid from the third flow path forcing the turbine piston away from the impeller shell and returning through the second chamber and the second flow path. Additionally, a thrust washer may be disposed axially between the spring retainer and the flange, wherein the thrust washer is attached to the spring retainer.

In embodiments, the flange of the damper assembly may be rotatably supported and centered on the turbine hub such that relative rotation between the flange and the turbine hub is allowed. A diaphragm spring may be disposed between the flange and the turbine shell, wherein the diaphragm spring is configured to bias the turbine piston away from the impeller shell in a clutch release position. The spring retainer may include a first opening and the turbine shell may include a second opening, wherein the diaphragm spring is disposed, at least partially, within the first and the second openings.

Embodiments provide the advantageous benefit of reduced costs and complexity of conventional three-pass torque converters by utilizing a simplified architecture. Embodiments further provide for improved clutch controllability, for example, by adding a separate, sealed apply chamber, as well as providing for non-crossed flow to the fluid chambers.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure provides improved clutch controllability for torque converters having the clutch integrated with the turbine by providing three fluid passages and a seal plate disposed between the piston plate and front cover to form an additional chamber to supply apply pressure flow for lock-up clutch engagement. The additional chamber for apply pressure flow helps control the pressure change between the fluid chambers. Moreover, embodiments disclosed herein provide for a geometry that allows for non-crossed fluid flow thereby eliminating the use of a large, complex and expensive forged pilot hub that is typically used in many three pass torque converter designs for directing fluid flow to fluid chambers.

Figure 1:
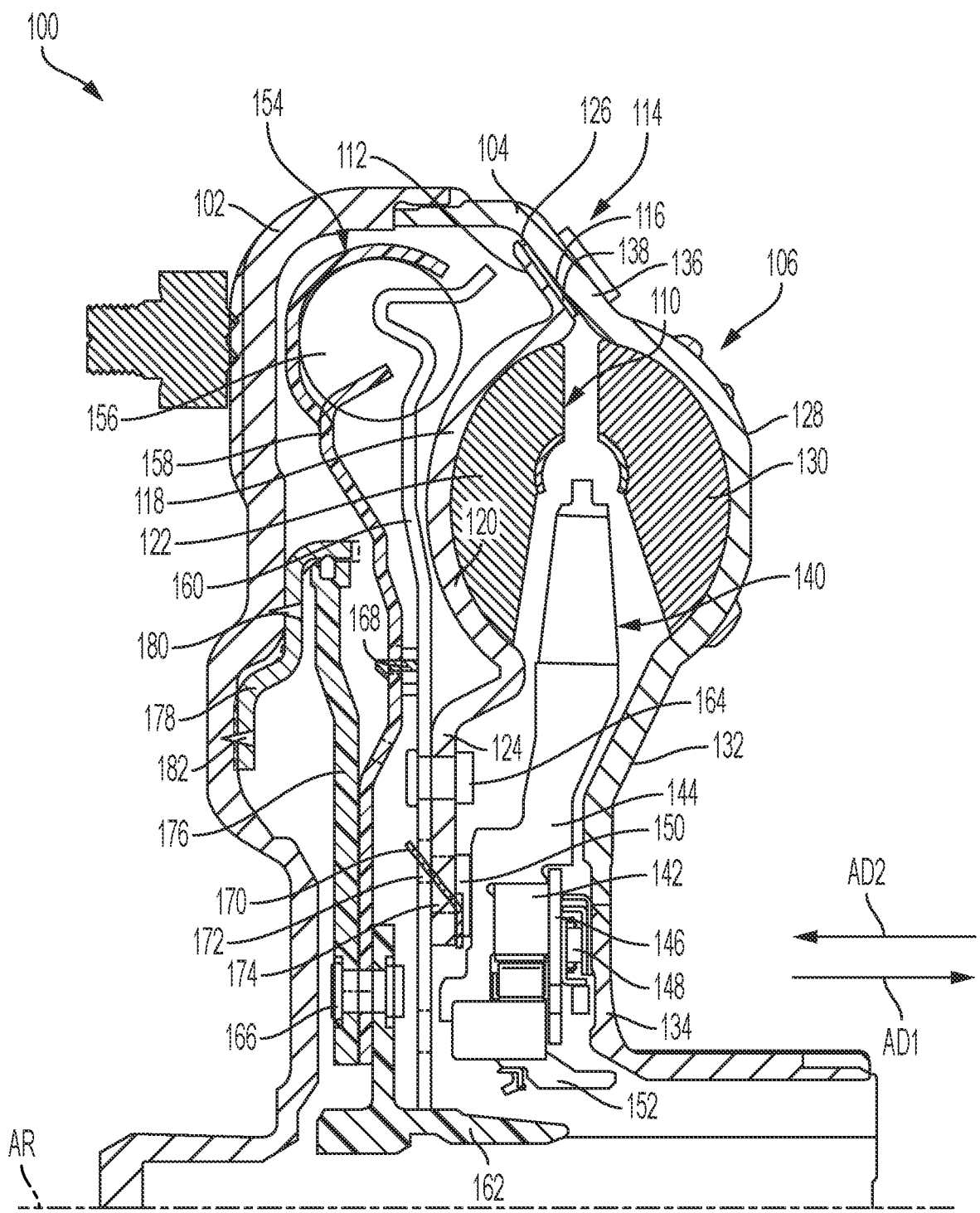
FIG. 1 is a cross-sectional view of a torque converter according to an embodiment of the present disclosure.
Figure 2:
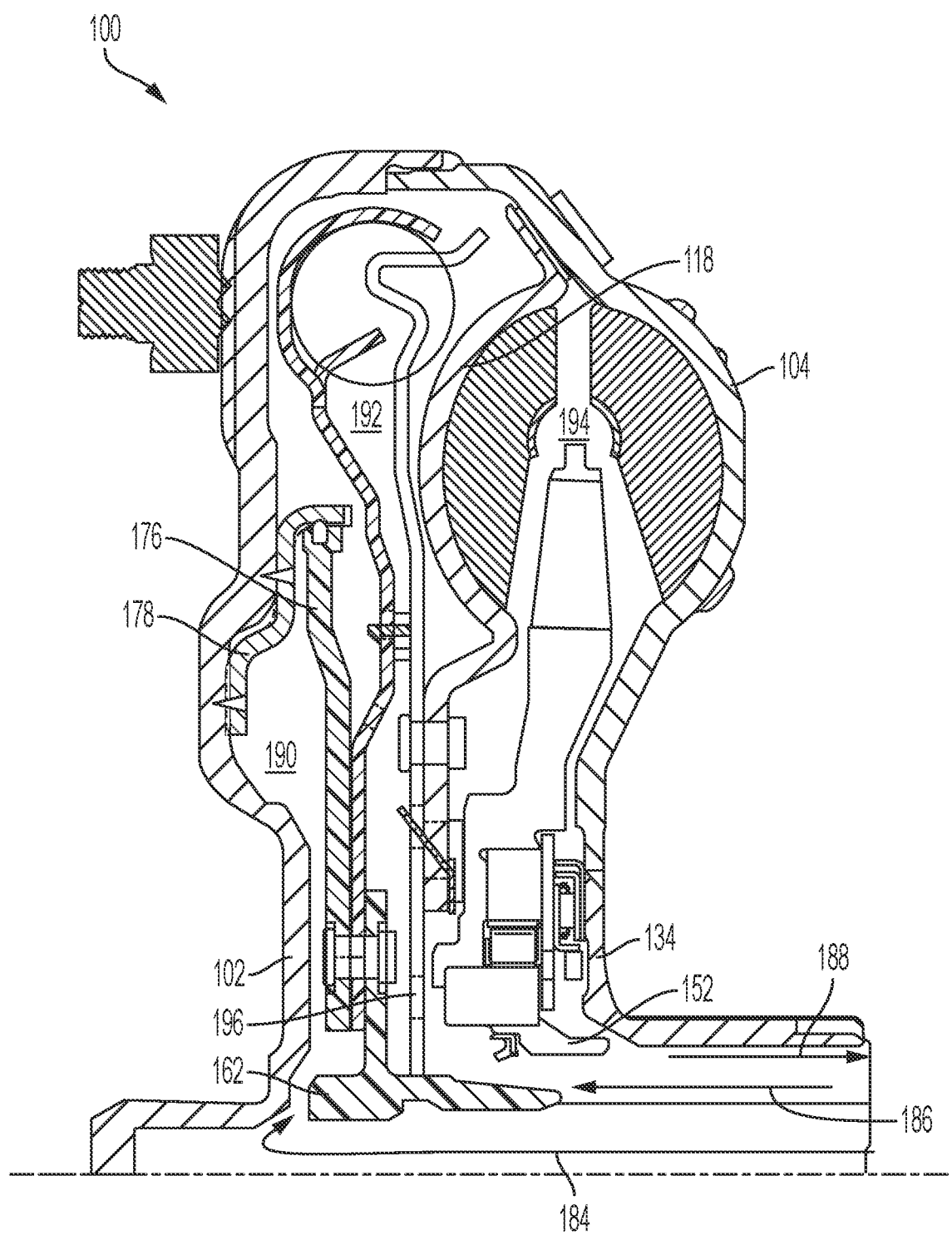
FIG. 2 shows the apply pressure flow and circulation flow areas of the torque converter of FIG. 1.

FIG. 1 shows a cross-sectional view of torque converter 100 according to an embodiment of the present disclosure. FIG. 2 shows the apply pressure flow and circulation flow areas of torque converter 100. The following description is made with reference to FIGS. 1-2. Torque converter 100 is rotatable about a center axis AR and includes front cover 102 for connecting to a crankshaft or a flexplate of an internal combustion engine (not shown) and impeller shell 104 of impeller or pump 106 forming a rear cover of torque converter 100. Impeller shell 104 is fixed to front cover 102, for example, via a welded connection. That is, front cover 102 and impeller shell 104 form a housing or enclosure of torque converter 100. The terms axially, radially and circumferentially as used herein are used with respect to center axis AR.

Torque converter 100 also includes turbine 110 configured to define turbine piston 112 that is axially moveable in a first axial direction AD1 toward impeller shell 104 and in a second axial direction AD2 away from impeller shell 104 to selectively engage inner surface 116 of impeller shell 104 so as to form lockup clutch 114. Turbine 110 includes a turbine shell 118. Turbine shell 118 includes rounded blade supporting portion 120 for supporting turbine blades 122. Radially inside of blade supporting portion 120, turbine shell 118 includes an annular inner radial extension 124. Turbine piston 112 is disposed radially outside of blade supporting portion 120 and turbine blades 122. Turbine piston 112 may include radially extending surface 126 facing inner surface 116 of impeller shell 104. Turbine piston 112 and turbine shell 118 may be integrally formed. That is, turbine piston 112 and turbine shell 118 may be formed as a single piece.

Impeller shell 104 includes rounded blade supporting portion 128 for supporting impeller blades 130. Radially inside of blade supporting portion 128, impeller shell 104 includes inner radial extension 132 that, at an inner radial end thereof, is fixed to impeller hub 134, for example, via welding. Impeller shell 104 further includes outer radial extension 136 extending radially outward from blade supporting portion 128 and forms part of lock-up clutch 114. Outer radial extension 136 is configured to engage with turbine piston 112 to transfer torque therebetween. Outer radial extension 136 may be formed integrally with rounded blade supporting portion 128. In one embodiment, friction material 138 may be bonded onto radially extending surface 126 of turbine piston 112 for engaging outer radial extension 136 of impeller shell 104. In other embodiments, friction material 138 may be bonded on outer radial extension 136 of impeller shell 104.

Torque converter 100 also includes stator 140 disposed axially between turbine 110 and impeller 106 to redirect fluid flowing from turbine blades 122 before the fluid reaches impeller 106 to increase the efficiency of torque converter 100. Stator 140 may also include a one-way clutch 142 held within stator body 144 by side plate 146. Bearing 148 is disposed axially between side plate 146 and impeller shell 104 and impeller hub 134. Thrust washer 150 is disposed axially between stator body 144 and inner radial extension 124 of turbine shell 118. Stator 140 is further connected to stator hub 152 by one-way clutch 142 for rotation in one rotational direction about center axis AR.

Damper assembly 154 is positioned axially between front cover 102 and turbine shell 118 and is configured for transferring torque from turbine 110 to a transmission input shaft (not shown). Damper assembly 154 includes: springs 156, spring retainer 158 supporting springs 156, and flange 160. Flange 160 is disposed axially between spring retainer 158 and turbine shell 118 and is configured to act as an input for damper 154 to transfer torque from turbine shell 118 to springs 156, spring retainer 158, and turbine hub 162. Flange 160 is non-rotatably connected to turbine shell 118, for example, by connector 164. Connector 164 may be a rivet, for example. Flange 160 is further supported, and centered on, turbine hub 162. Flange 160 is arranged on turbine hub 162 such that relative rotation with turbine hub 162 is permitted. This allows transmission of the torque to the transmission input shaft completely by damper assembly 154.

Spring retainer 158 is non-rotatably connected to turbine hub 162, for example, via connector 166 which may be a rivet. In this way, spring retainer 158 acts as an output to damper assembly 154 to transfer torque to turbine hub 162 from flange 160 and springs 156. Thrust washer 168 is disposed axially between spring retainer 158 and flange 160 and is attached to spring retainer 158, for example, thrust washer 168 may be clipped to spring retainer 158. Diaphragm spring 170 is disposed between flange 160 and turbine shell 118 and is configured to maintain clutch 114 in release position during release. That is, diaphragm spring 170 may be disposed, at least partially, within opening 172 defined in flange 160 and opening 174 defined in inner radial extension 124 of turbine shell 118. Openings 172 and 174 are arranged such that they partially overlap in a radial direction with respect to axis of rotation AR.

Torque converter 100 further includes piston plate 176 and seal plate 178. Piston plate 176 is disposed between seal plate 178 and spring retainer 158 and is connected to spring retainer 158 and turbine hub 162 via connector 166. Piston plate 176 is further sealed to seal plate 178 at an outer diameter thereof and is configured to be axially moveable in axial direction AD1 and axial direction AD2 to displace turbine piston 112 for engagement of clutch 114. Seal plate 178 is disposed axially between piston plate 176 and front cover 102 and is fixed to front cover 102, for example via welds 180, 182

Torque converter 100 is advantageously provided with three fluid paths 184, 186, 188 for providing fluid to three pressure chambers 190, 192, 194 to provide for improved controllability of lock-up clutch 114 (see, for example, FIG. 2). Pressure chamber 190 (also referred to as apply chamber) is formed between front cover 102, seal plate 178, and piston plate 176. Pressure chamber 192 is formed, at least partially, between piston plate 176, front cover 102, and turbine shell 118, with damper assembly 154 being positioned within pressure chamber 192. Pressure chamber 194 is formed between turbine shell 118 and impeller shell 104. Seal plate 178 is configured to seal pressure chamber 190 from pressure chamber 192. Fluid is supplied from the transmission input shaft to pressure, or apply, chamber 190 via fluid flow path 184 that is bounded, at least in part, by turbine hub 162 and front cover 102. Fluid is supplied from the transmission input shaft to pressure chamber 192 via fluid flow path 186 that is bounded, at least in part, by turbine hub 162 and stator hub 152. Fluid supplied to pressure chamber 192 may be returned through pressure chamber 194 via clutch 114 and exit through fluid flow path 188 bound, at least in part, by stator hub 152 and impeller hub 134.

Pressure chambers 190 and 194 may be used for clutch apply and release and pressure chamber 192 may be used for cooling circulation flow. That is, during lock-up mode, pressure, or apply, chamber 190 is pressurized via fluid path 184 to lock-up clutch 114 by displacing piston plate 176 in axial direction AD1 forcing turbine piston 112 against outer radial extension 136 of impeller shell 104 for engagement therewith. Apply pressure is provided sufficient to overcome the force of diaphragm spring 170, which biases clutch 114 in the release or open position. During lock-up mode, pressure chamber 192 may also be pressurized with a cooling flow via fluid flow path 186, with the return cooling flow returning through pressure chamber 194, which cools friction material 138 of clutch 114. That is, cooling fluid may be supplied via flow path 186 and routed through opening 196 defined in flange 160 to chamber 192 where it will then be forced through clutch 114, for example, friction material 138 may include a grooved surface for fluid flow therethrough.

During clutch release, in which turbine piston 112 is forced away from outer radial extension 136 of impeller shell 104, pressure chamber 194 may be pressurized with fluid via flow path 188, with return flow going through chamber 192 and flow path 186. Having pressure or apply chamber 190 in addition to pressure chambers 192, 194 allows for more precise control of apply pressure to provide better clutch control on the clutch apply than conventional torque converters with integrated turbine pistons.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller shell
106 impeller
110 turbine
112 turbine piston
114 lock-up clutch
116 inner surface
118 turbine shell
120 blade supporting portion
122 turbine blades
124 inner radial extension
126 radially extending surface
128 blade supporting portion
130 impeller blades
132 inner radial extension
134 impeller hub
136 outer radial extension
138 friction material
140 stator
142 one-way clutch
144 stator body
146 side plate
148 bearing
150 thrust washer
152 stator hub
154 damper assembly
156 springs
158 spring retainer
160 flange
162 turbine hub
164 connector
166 connector
168 thrust washer
170 diaphragm spring
172 opening
174 opening
176 piston plate
178 seal plate
180 welds
182 welds
184 fluid flow path
186 fluid flow path
188 fluid flow path
190 pressure chamber
192 pressure chamber
194 pressure chamber
196 opening

What is claimed is:

1. A torque converter comprising:
a front cover;
an impeller including an impeller shell fixed to the front cover;
a turbine including a turbine shell axially movable to frictionally engage the impeller shell such that the turbine shell forms a turbine piston of a lock-up clutch;
a damper assembly disposed between the front cover and the turbine shell, the damper assembly comprising:
springs;
a flange connected to the turbine shell and drivingly engaged with the springs;
a spring retainer supporting the springs and connected to a turbine hub;
a piston plate disposed between the spring retainer and the front cover, wherein the piston plate is configured to be axially displaceable to force the turbine piston against the impeller shell for engagement of the lock-up clutch; and
a seal plate fixed to the front cover and disposed between the front cover and the piston plate, wherein the piston plate is sealed to the seal plate.

2. The torque converter of claim 1, wherein the piston plate is sealed to the seal plate at an outer diameter and connected to the spring retainer and the turbine hub by a connector.

3. The torque converter of claim 1, wherein:
a first chamber is formed, at least in part, by the front cover, the seal plate, and the piston plate; and
a first flow path is configured to supply fluid to the first chamber and is bound, at least in part, by the turbine hub and the front cover.

4. The torque converter of claim 3, wherein:
a second chamber is formed, at least in part, by the front cover, the piston plate, and the turbine shell; and
a second flow path is configured to supply fluid to the second chamber and is bound, at least in part, by the turbine hub and a stator hub.

5. The torque converter of claim 4, wherein the spring retainer includes an opening extending axially therethrough and the fluid is supplied from the second flow path to the second chamber via the opening.

6. The torque converter of claim 4, wherein:
a third chamber is formed, at least in part, by the turbine shell and the impeller shell; and
a third flow path is configured to supply fluid to the third chamber and is bound, at least in part, by the stator hub and an impeller hub.

7. The torque converter of claim 6, wherein during a lock-up mode of operation:
the first chamber is supplied fluid from the first flow path such that the piston plate is displaced axially toward the turbine shell forcing the turbine piston against the impeller shell; and
the second chamber is supplied cooling fluid from the second flow path that is then forced through the lock-up clutch into the third chamber exiting through the third flow path.

8. The torque converter of claim 6, wherein during clutch release the third chamber is supplied fluid from the third flow path forcing the turbine piston away from the impeller shell and returning through the second chamber and the second flow path.

9. The torque converter of claim 1, further comprising a thrust washer disposed axially between the spring retainer and the flange, wherein the thrust washer is attached to the spring retainer.

10. A torque converter, comprising:
a front cover;
an impeller including an impeller shell fixed to the front cover;
a turbine including a turbine shell axially movable to frictionally engage the impeller shell such that the turbine shell forms a turbine piston of a lock-up clutch;
a piston plate disposed between the turbine shell and the front cover, wherein the piston plate is configured to move the turbine piston in a first axial direction toward the impeller shell and in a second axial direction away from the impeller shell to selectively engage the lock-up clutch; and
a seal plate fixed to the front cover and disposed between the front cover and the piston plate, wherein the piston plate is sealed to the seal plate such that an apply chamber is formed between the front cover, the seal plate, and the piston plate to facilitate engagement of the lock-up clutch.

11. The torque converter of claim 10, further comprising a damper assembly disposed between the front cover and the turbine shell, the damper assembly comprising:
springs;
a flange connected to the turbine shell and drivingly engaged with the springs; and
a spring retainer supporting the springs and connected to the piston plate and a turbine hub via a single connector.

12. The torque converter of claim 11, wherein the flange is rotatably supported and centered on the turbine hub such that relative rotation between the flange and the turbine hub is allowed.

13. The torque converter of claim 11, further comprising a diaphragm spring disposed between the flange and the turbine shell, wherein the diaphragm spring is configured to bias the turbine piston away from the impeller shell in a clutch release position.

14. The torque converter of claim 13, wherein the spring retainer includes a first opening and the turbine shell includes a second opening, wherein the diaphragm spring is disposed, at least partially, within the first and the second openings.

15. The torque converter of claim 11, wherein a first flow path is provided that is bounded, at least in part, by the turbine hub and the front cover and is configured to supply fluid to the apply chamber.

\* \* \* \* \*